2,950,276
Patented Aug. 23, 1960

2,950,276

MONOAZO DYESTUFFS

Otto Schmid, Muttenz, Basel Land, and Meinrad Hurbin, Basel, Switzerland, assignors to J. R. Geigy A.-G., Basel, Switzerland No Drawing. Filed Nov. 15, 1957, Ser. No. 696,597

Claims priority, application Switzerland Dec. 5, 1956

7 Claims. (Cl. 260—196)

The invention concerns monoazo dyestuffs which are distinguished by good to very good drawing power onto wool from even a neutral to weakly acid bath, by pure orange to red shades and by good to very good light and wet fastness properties of the wool dyeings attained therewith. A preferred form of the invention concerns yellowish-red dyeing wool dyestuffs which are wet-fast and light-fast. The invention also concerns a process for the production of the new monoazo dyestuffs, their use for the fast dyeing of natural and synthetic polypeptide fibres as well as, as industrial product, the polypeptide material fast dyed with the aid of these dyestuffs.

It has been found that valuable monoazo dyestuffs are obtained if a diazotised 2-aminobenzene-1-sulphonic acid amide, which may be further substituted at the benzene ring, containing 2 saturated organic substituents at the tertiary nitrogen atom of the sulphamide group which together have, in all, at least 11 and advantageously 12 or more carbon atoms of which at least 10 carbon atoms form part of alicyclic radicals, is coupled in an acid medium with an aminonaphthalene compound coupling in the o-position to the amino group, the components being so chosen that the monoazo dyestuff contains at least one, but not more than two acid dissociating groups of hexa-valent sulphur forming neutral alkali metal salts. Advantageously both organic substituents of the tertiary sulphamide group in the diazo component are or contain 6-membered cycloaliphatic radicals.

In the diazo components used according to the present invention, the sulphamide group is derived advantageously from dicyclohexylamine. The sulphamide group can also be derived, for example, from N-(2- or 4-methylcyclohexyl) - N - cyclohexylamine, from bis-(2- or 4-methylcyclohexyl) - amine, from bis-(2,4-dimethylcyclohexyl)-amine, from bis - (3.3.5 - trimethylcyclohexyl)-amine, from N - cyclohexyl - N - hexahydrobenzylamine, from N-cyclohexyl-N-(2 - cyclohexylethyl) - amine, from bis-(hexahydrobenzyl)-amine, from bis - (2 - cyclohexylethyl)-amine, from N-decahydro-naphthyl-N-ethyl- or -N-butylamine.

The benzene ring of the diazo component is either not further substituted or it contains advantageously non-ionogenic substitutents, for example hydrocarbon radicals such as methyl, ethyl, tertiary butyl, tertiary amyl, cyclohexyl groups; ether groups such as methoxy, ethoxy, butoxy groups; acylamino groups such as e.g. acetylamino, phenylacetylamino, phenoxacetylamino, carbomethoxy-, carboethoxy- or carbobutoxyamino groups.

It is also possible however, for the benzene ring of the diazo component to contain more negatively non-ionogenic substituents, for example halogen such as fluorine, chlorine or bromine, the trifluoromethyl group, sulphonic acid amide groups in particular tertiary sulphamide groups derived from secondary organic amines, for example N.N-dimethyl, N.N-diethyl, N.N-dibutyl, N.N-dibenzyl, N.N-dicyclohexyl, N.N-ethylphenyl, N.N-butyl-cyclohexyl sulphamide groups, sulphonic acid ester groups such as e.g. the sulphonic acid phenol ester, sulphonic acid-o-, -m- or -p-methylphenyl ester groups, or alkyl, aralkyl or aryl sulphonyl groups such as e.g. methyl, ethyl, butyl, benzyl, phenyl, p-methylphenyl sulphonyl groups.

Diazo components usable according to the present invention are obtained by reacting possibly further substituted 2-nitrobenzene-1-sulphonic acid chlorides with suitable secondary amines to form the corresponding 2-nitrobenzene-1-sulphonic acid amide and reducing the nitro group to the amino group. In some cases, diazo components usable according to the present invention can also be obtained by reacting the alkali metal salts of o-nitrobenzene sulphamides derived from primary amines metal salts of such as cyclohexylamine, hexahydrobenzylamine, decahydronaphthylamine, in inert organic solvents such as benzene, and homologues thereof, their halogen or nitro compounds, with suitable alkylating agents, for example with ethyl or butyl chloride, cyclohexylmethyl chloride, cyclohexylethyl chloride, and then reducing the nitro group to the amino group.

Aminonaphthalene compounds coupling in the neighbouring position to the amino group are used as coupling components. Chiefly 2-aminonaphthalene sulphonic acids coupling in the 1-position and advantageously monosulphonic acids such as e.g. 2-aminonaphthalene-5-, -6- or -7-sulphonic acid are used for orange dyestuffs and in particular 2-amino-8 - hydroxynaphthalene - 6 - sulphonic acid is used for red dyestuffs. However, when suitably substituted in the diazo components, also disulphonic acids such as 2-aminonaphthalene-3.6-disulphonic acid and 2-amino-8-hydroxynaphthalene-3.6-disulphonic acid produce dyestuffs which can be used according to the present invention. Coupling components having a primary amino group produce more fast to light dyestuffs than dyestuffs having a secondary amino group and are thus preferred.

The monoazo dyestuffs according to the present invention contain advantageously sulphonic acid groups as acid dissociating groups of hexavalent sulphur forming neutral alkali metal salts, and these are advantageously in the coupling component. Also acylated sulphamide groups can be used as other acid dissociating, water solubilising groups of hexavalent sulphur forming neutral alkali metal salts, for example disulphimide groups. Acid dissociating groups of hexavalent sulphur which promote water solubility can also be in an external position, for example in a sulphoacetylamino group.

The diazo components used according to the present invention are diazotised by the usual methods, for example in concentrated sulphuric acid solution with alkali nitrites or with nitrosyl sulphuric acid; the diazo components can also be diazotised in lower fatty acids such as acetic or formic acid in the presence of the necessary amount of aqueous mineral acids, with concentrated aqueous solutions of alkali nitrite.

Depending on the solubility of the azo component, the coupling is performed either in inert organic-aqueous solution, for example in the presence of lower alcohols, lower fatty acids or lower fatty acid amides. If sulphonated coupling components are used it is performed in acid aqueous solution of their alkali salts and advantageously in the presence of salts of lower fatty acids.

The most technically interesting dyestuffs are obtained from diazotised 2-aminobenzene-1-sulphonic acid dicyclohexylamides which may be further substituted non-ionogenically at the benzene ring-from 2-aminonaphthalene monosulphonic acids coupling in the 1-position and, in particular with 2-amino - 8 - hydroxynaphthalene - 6 - sulphonic acid.

These preferred dyestuffs correspond to the general formula:

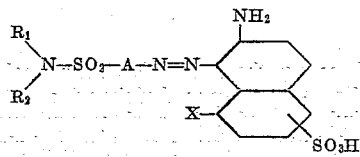

wherein $R_1$ and $R_2$ represent saturated organic radicals having together at least 11 carbon atoms of which at least 10 carbon atoms form part of alicyclic rings, A represents a benzene ring containing the sulphamide group in o-position to the azo linkage, and X represents hydrogen or the hydroxyl group.

$R_1$ and $R_2$ represent chiefly cyclohexyl radicals, also homologous cyclohexyl radicals and cyclohexyl-substituted lower alkyl radicals. The benzene ring A is, advantageously, not further substituted, or if so it is substituted by lower alkyl, lower alkoxy groups or by halogens such as fluorine, chlorine or bromine. It can also contain other non-ionogenic substituents however, for example alkyl-, aralkyl- or aryl-sulphonyl groups, tertiary sulphamide groups or sulphonic acid arylester groups.

In the form of their alkali metal salts, the new dyestuffs are orange, red to red-brown powders. They dissolve well in hot water and dye wool, silk and synthetic polypeptide fibres in pure orange to red shades. The wool dyeings have good fastness to wet and light.

The following examples illustrate the invention. Where not otherwise stated, parts are given as parts by weight and the temperatures are in degrees centigrade. The relationship of parts by weight to parts by volume is as that of grammes to cubic centimetres.

EXAMPLE 1

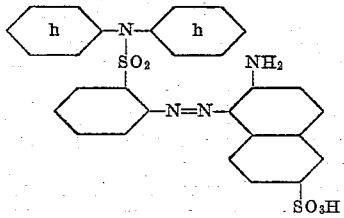

33.6 parts of 2-aminobenzene-1-sulphonic acid dicyclohexylamide and 19 parts of concentrated sulphuric acid are dissolved cold in 150 parts of glacial acetic acid and a solution of 6.9 parts of sodium nitrite in 15 parts of water is slowly added dropwise at 10–15° while stirring well. 50 parts of ice are gradually added and then the yellowish solution is poured at 0–5° into the solution of the sodium salt of 22.5 parts of 2-aminonaphthalene-6-sulphonic acid and 40 parts of crystallised sodium acetate in 500 parts of water. The azo dyestuff formed precipitates immediately as a red-orange powder. The mixture is stirred for several hours at 0–10°, then warmed to 60°, the acid is partly neutralised by sprinkling in of 30 parts of sodium carbonate and the dyestuff is filtered off and dried. In the form of the dry sodium salt it is a red-orange powder which dissolves in hot water with an orange and in concentrated sulphuric acid with a brownish-orange colour.

In a dyebath containing 5% ammonium sulphate, the dyestuff dyes wool in level orange shades which have good fastness to light.

EXAMPLE 2

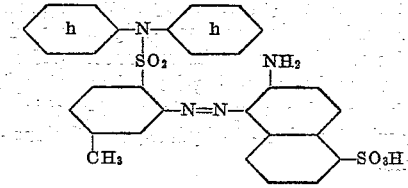

35.0 parts of 5-methyl-2-aminobenzene-1-sulphonic acid dicyclohexylamide in 150 parts of glacial acetic acid and 19 parts of sulphuric acid are diazotised as described in Example 1 with 6.9 parts of sodium nitrite. The diazo solution diluted with ice water is gradually poured at 0–5° while stirring into the solution of the sodium salt of 22.5 parts of 2-aminonaphthalene-5-sulphonic acid and 50 parts of crystallised sodium acetate in 500 parts of water. The monoazo dyestuff which forms immediately precipitates in the form of an orange powder. The mixture is stirred for several hours at 0–10°, then warmed to 60°, the acid is partly neutralised by sprinkling in 50 parts of sodium carbonate and then the orange precipitate is filtered off under suction and dried. The dyestuff dissolves well in hot water with an orange colour; in concentrated sulphuric acid it dissolves with a brown-orange colour. It dyes wool on boiling in a liquor containing 5% ammonium sulphate in pure orange shades which are fast to light.

The diazo component is obtained from 4-methyl-2-nitrobenzene-1-sulphonic acid chloride by reacting with excess dicyclohexylamide in benzene, and reducing the nitro group to the amino group. The 4-methyl-2-nitrobenzene-1-sulphonic acid chloride is obtained by reacting 4-methyl-2-nitro-1-chlorobenzene with sodium disulphide in methyl alcohol to form 4.4′-dimethyl-2.2′-dinitrodiphenyl disulphide and treating this compound with chlorine in 90% acetic acid.

EXAMPLE 3

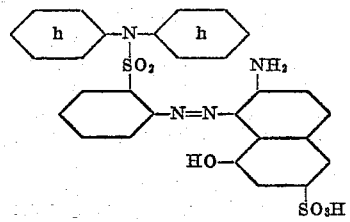

33.6 parts of 2-aminobenzene-1-sulphonic acid dicyclohexylamide are diazotised as described in Example 1 and coupled at 0–5° with a solution of the sodium salt of 24.0 parts of 2-amino-8-hydroxynaphthalene-6-sulphonic acid and 40 parts of crystallised sodium acetate in 500 parts of water. The monoazo dyestuff formed precipitates immediately in the form of a dark red powder. The mixture is stirred for several hours at 0–10°, then warmed to 60°, the acid is partly neutralised by sprinkling in 50 parts of sodium carbonate, the dyestuff is filtered off under suction and dried. It is a dark red powder which dissolves well in hot water with a red colour and in concentrated sulphuric acid with a Bordeaux red colour. It dyes wool in pure yellowish red shades which are fast to wet and light.

EXAMPLE 4

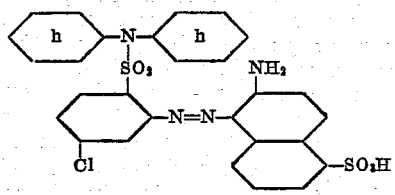

37.05 parts of 2-amino-4-chlorobenzene-1-sulphonic acid dicyclohexylamide (M.P. 134°) are suspended in 140 parts of glacial acetic acid, dissolved by the dropwise addition of 19 parts of concentrated sulphuric and diazotised at 10–12° by the slow addition of a solution of 6.9 parts of sodium nitrite in 15 parts of water. The diazo solution is poured at 0–5° into a solution of the sodium salt of 22.3 parts of 2-aminonaphthalene-5-sulphonic acid and 40 parts of crystallised sodium acetate in 500 parts of water. The whole is stirred for several hours, heated to 60°, 60 parts of sodium chloride are added and the dyestuff which precipitates is filtered off and dried.

It is a red powder which dissolves in concentrated sulphuric acid with a yellow-orange and in water with an orange colour. It dyes wool from a neutral to weakly acid bath in fast orange shades.

EXAMPLE 5

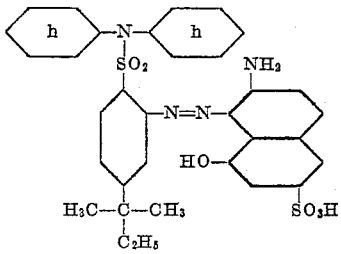

40.6 parts of 2-amino-4-tert. amylbenzene-1-sulphonic acid dicyclohexylamide (M.P. 158–159°) are dissolved in 150 parts of glacial acetic acid and 25 parts of 30% hydrochloric acid and a solution of 6.9 parts of sodium nitrite in 15 parts of water is added dropwise while stirring well at 10–15°. The diazo solution so obtained is slowly poured at 0–5° into an acetic acid solution of the sodium salt of 24 parts of 2-amino-8-hydroxynaphthalene-6-sulphonic acid in 600 parts of water. After one hour, a solution of 22 parts of crystallised sodium acetate in 50 parts of water is added, the whole is stirred for several hours, heated finally to 70° and 30 parts of sodium chloride are added. The precipitated dyestuff is filtered off and dried.

It is a red powder which dissolves in concentrated sulphuric acid with a bluish-red and in hot water with a red colour. It dyes wool from a neutral to weakly acid bath in fast red shades.

EXAMPLE 6

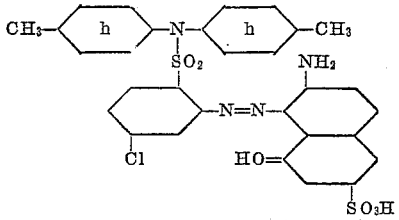

39.85 parts of 2-amino-4-chlorobenzene-1-sulphonic acid-bis-(4'-methylcyclohexyl)-amide are dissolved in 150 parts of glacial acetic acid with 19 parts of concentrated sulphuric acid and the solution is diazotised at 10–12° by the slow addition of a solution of 6.9 parts of sodium nitrite in 15 parts of water. The diazo solution is poured at 0–5° into an acetic acid solution of the sodium salt of 24 parts of 2-amino-8-hydroxynaphthalene-6-sulphonic acid and 40 parts of crystallised sodium acetate in 500 parts of water. The whole is stirred for several hours at 0–10°, then heated to 60°, 50 parts of sodium chloride are added, the precipitated dyestuff is filtered off and dried.

It dissolves in concentrated sulphuric acid with a red-brown and in water with a bluish-red colour and dyes wool from a neutral to weakly acid bath in fast red shades.

EXAMPLE 7

100 g. of well previously wetted wool are entered at 50° into a liquor which contains 1.5 g. of the red dyestuff according to Example 3, 5 g. of ammonium sulphate and 5 g. of Glauber's salt in 3 litres of water. The bath is brought to the boil within 10 minutes and kept at the boil for 45 minutes. In this time the dyestuff is almost completely drawn onto the wool. A very level, very pure red wool dyeing is obtained which has very good fastness to wet and light.

Other monoazo dyestuffs according to the present invention are given in the following table. They can be produced by using the corresponding amounts of diazo and azo components according to the methods described in Examples 1 to 6.

Table

| No. | Diazo component | Azo component | Wool dyeing |
|---|---|---|---|
| 1 | 2-aminobenzene-1-sulphonic acid-dicyclohexylamide. | 2-aminonapthalene-7-sulphonic acid. | orange. |
| 2 | ——do—— | 2-aminonaphthalene-5-sulphonic acid. | Do. |
| 3 | ——do—— | 2-(2',6'-dimethylphenylamino)-8-hydroxynaphthalene-6-sulphonic acid. | blue-red. |
| 4 | 2-amino-4-methylbenzene-1-sulphonic acid dicyclohexylamide. | 2-aminonaphthalene-6-sulphonic acid. | orange. |
| 5 | ——do—— | 2-amino-8-hydroxynaphthalene-6-sulfonic acid. | red. |
| 6 | ——do—— | 2-(2',6'-dimethylphenylamino)-8-hydroxynaphthalene-6-sulphonic acid. | blue-red. |
| 7 | 2-amino-4-chlorobenzene-1-sulphonic acid dicyclohexylamide. | 2-amino-8-hydroxynaphthalene-6-sulphonic acid. | red. |
| 8 | 2-amino-5-chlorobenzene-1-sulphonic acid dicyclohexylamide. | ——do—— | Do. |
| 9 | ——do—— | 2-aminonaphthalene-7-sulphonic acid. | red-orange. |
| 10 | 2-amino-4-(4'-methylphenylsulphonyl)-1-sulphonic acid dicyclohexylamide. | ——do—— | Do. |
| 11 | ——do—— | 2-amino-8-hydroxynaphthalene-6-sulphonic acid. | bluish red. |
| 12 | 2-amino-4-chloracetylaminobenzene-1-sulphonic acid dicyclohexylamide. | ——do—— | Do. |
| 13 | ——do—— | 2-aminonaphthalene-6-sulphonic acid. | orange. |
| 14 | 2-amino-5-bromopropionylaminobenzene-1-sulphonic acid dicyclohexylamide. | ——do—— | Do. |
| 15 | ——do—— | 2-amino-8-hydroxynaphthalene-6-sulphonic acid. | bluish red. |
| 16 | 2-aminobenzene-1-sulfonic acid-N-cyclohexyl-N-hexahydrobenzylamide. | 2-aminonaphthalene-5-sulphonic acid. | orange. |
| 17 | ——do—— | 2-amino-8-hydroxynaphthalene-6-sulphonic acid. | red. |
| 18 | 2-aminobenzene-1-sulphonic acid-bis-(4'-methylcyclohexyl)-amide. | ——do—— | Do. |
| 19 | ——do—— | 2-aminonaphthalene-7-sulphonic acid. | orange. |
| 20 | 2-aminobenzene-1-sulphonic acid-N-decahydronaphthyl-N-butylamide. | ——do—— | Do. |
| 21 | ——do—— | 2-amino-8-hydroxynaphthalene-6-sulphonic acid. | red. |

What we claim is:

1. A monoazo dyestuff of the general formula:

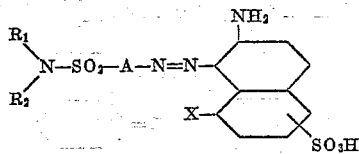

wherein each of $R_1$ and $R_2$ represents an at most bicyclic saturated organic radical, $R_1$ and $R_2$ containing together at least 11 carbon atoms of which at least 10 carbon atoms belong to six-membered alicyclic rings, A represents a radical of the benzene series containing the sulphamide substituent in o-position to the azo linkage, and X represents a member selected from the group consisting of hydrogen and hydroxy.

2. A monoazo dyestuff of the general formula:

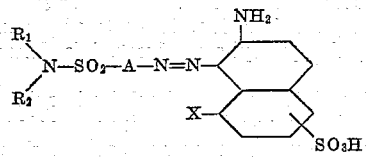

wherein $R_1$ and $R_2$ each represent a saturated hydrocarbon radical selected from the group consisting of cyclohexyl, methyl-substituted cyclohexyl and cyclohexyl-substituted lower alkyl radicals, A represents a radical of the benzene series containing the sulphamide substituent in o-position to the azo linkage, and X represents a member selected from the group consisting of hydrogen and hydroxy.

3. The monoazo dyestuff of the formula:

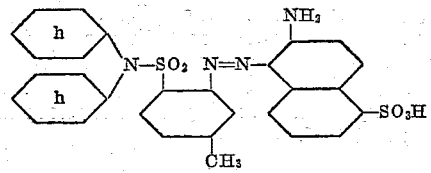

4. The monoazo dyestuff of the formula:

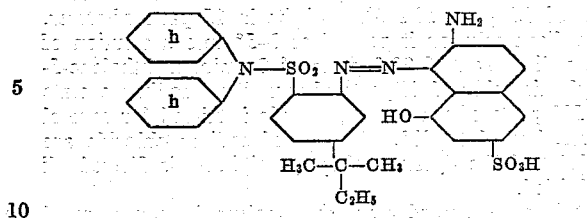

5. The monoazo dyestuff of the formula:

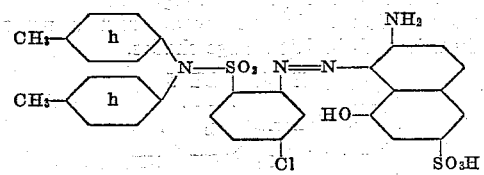

6. The monoazo dyestuff of the formula:

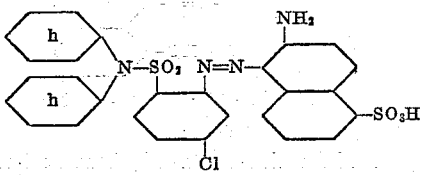

7. The monoazo dyestuff of the formula:

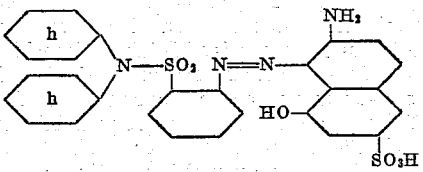

References Cited in the file of this patent

UNITED STATES PATENTS

| | | |
|---|---|---|
| 2,095,468 | Fleischhauer et al. | Oct. 12, 1937 |
| 2,105,862 | Knecht et al. | Jan. 18, 1938 |
| 2,274,717 | Lyford | Mar. 3, 1942 |

FOREIGN PATENTS

| | | |
|---|---|---|
| 798,038 | France | Feb. 24, 1936 |